United States Patent [19]

Lindahl

[11] Patent Number: 4,993,781
[45] Date of Patent: Feb. 19, 1991

[54] ANTIJAM BRAKE-METERING VALVE AND METHOD FOR ITS USE

[75] Inventor: Gary M. Lindahl, Renton, Wash.

[73] Assignee: The Boeing Company, Seattle, Wash.

[21] Appl. No.: 410,317

[22] Filed: Sep. 21, 1989

[51] Int. Cl.⁵ .................... B60T 15/04; B64C 25/22; F15B 13/14
[52] U.S. Cl. .................... 303/117; 303/50; 91/434; 244/111
[58] Field of Search .......... 303/50, 117; 244/110 A, 244/110 H, 111; 137/625.69; 91/434

[56] References Cited

U.S. PATENT DOCUMENTS

| | | | |
|---|---|---|---|
| 2,613,650 | 10/1952 | Mott | 91/20 |
| 3,253,613 | 5/1966 | Richolt | 137/596 |
| 3,439,707 | 4/1969 | York et al. | 137/596 |
| 3,768,376 | 10/1973 | Orme | 91/466 |
| 4,090,429 | 5/1978 | Kamimura | 91/466 |
| 4,120,540 | 10/1978 | Devlieg | 303/117 |
| 4,360,239 | 11/1982 | Boehringer | 303/117 |
| 4,545,407 | 10/1985 | Dudash | 137/596 |
| 4,640,475 | 2/1987 | Zoerb | 244/111 |
| 4,685,748 | 8/1987 | Zoerb | 244/111 X |
| 4,714,298 | 12/1987 | Mail | 303/100 |

Primary Examiner—Robert P. Olszewski
Assistant Examiner—A. Muratori
Attorney, Agent, or Firm—Seed and Berry

[57] ABSTRACT

A port control member is depressed by either a mechanical force applied on it by the pilot, for moving it to meter pressure and flow from a supply pressure to the wheel brakes, or a hydraulic pressure force applied following take-off, to actuate the brakes for stopping the wheels from spinning. The valve housing defines an annular pressure chamber surrounding a portion of the port control member. The port control member includes a feedback passageway between the pressure chamber and a feedback chamber formed between the inner end of the port control member and the valve housing. The port control member is also surrounded by a sleeve which has an inner surface extending radially outwardly from the inner end of the port control member. The feedback passageway, which can include a damping orifice, produces a feedback force to the pilot which is increased when the sleeve is jammed with respect to the port control member.

9 Claims, 4 Drawing Sheets

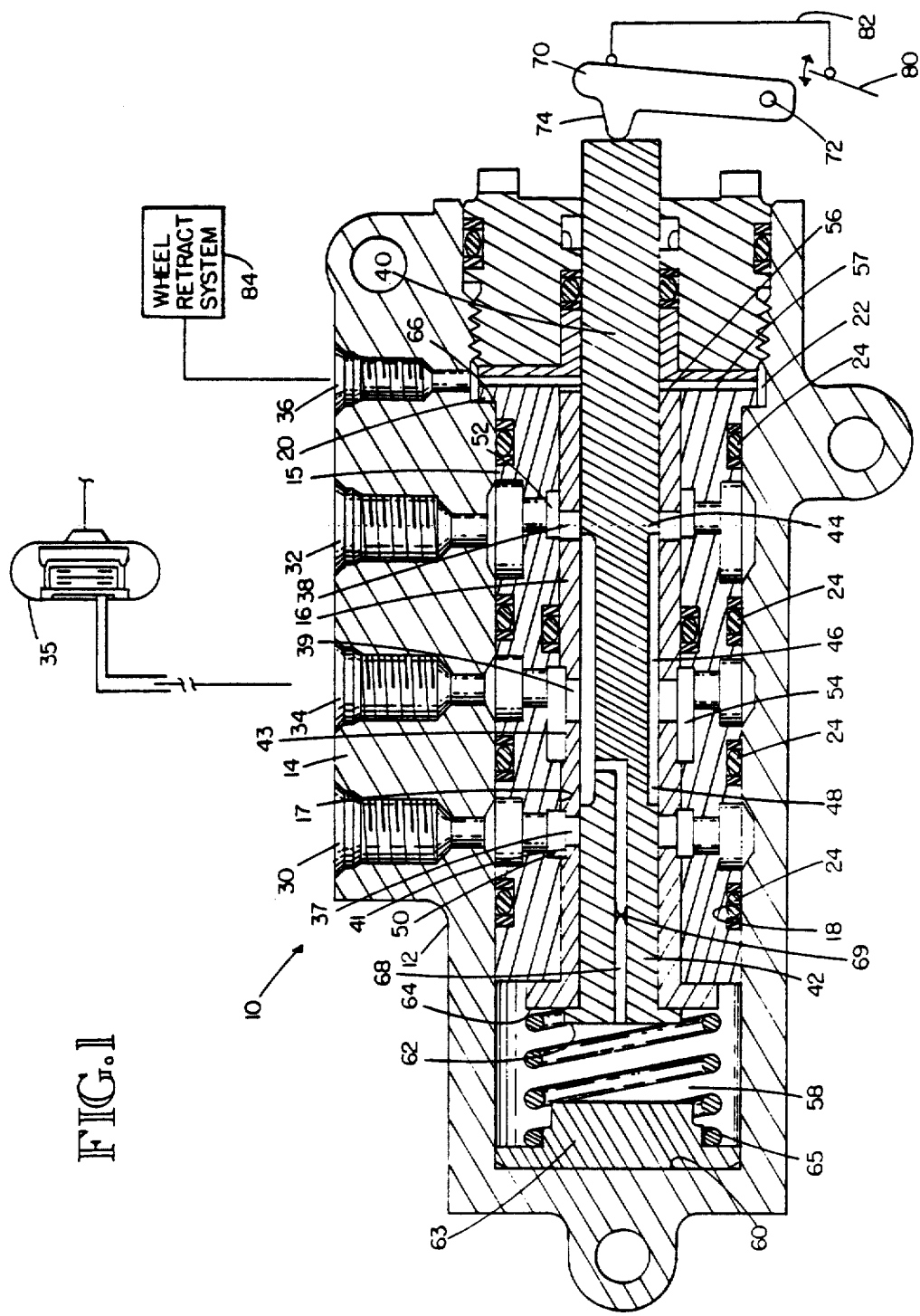

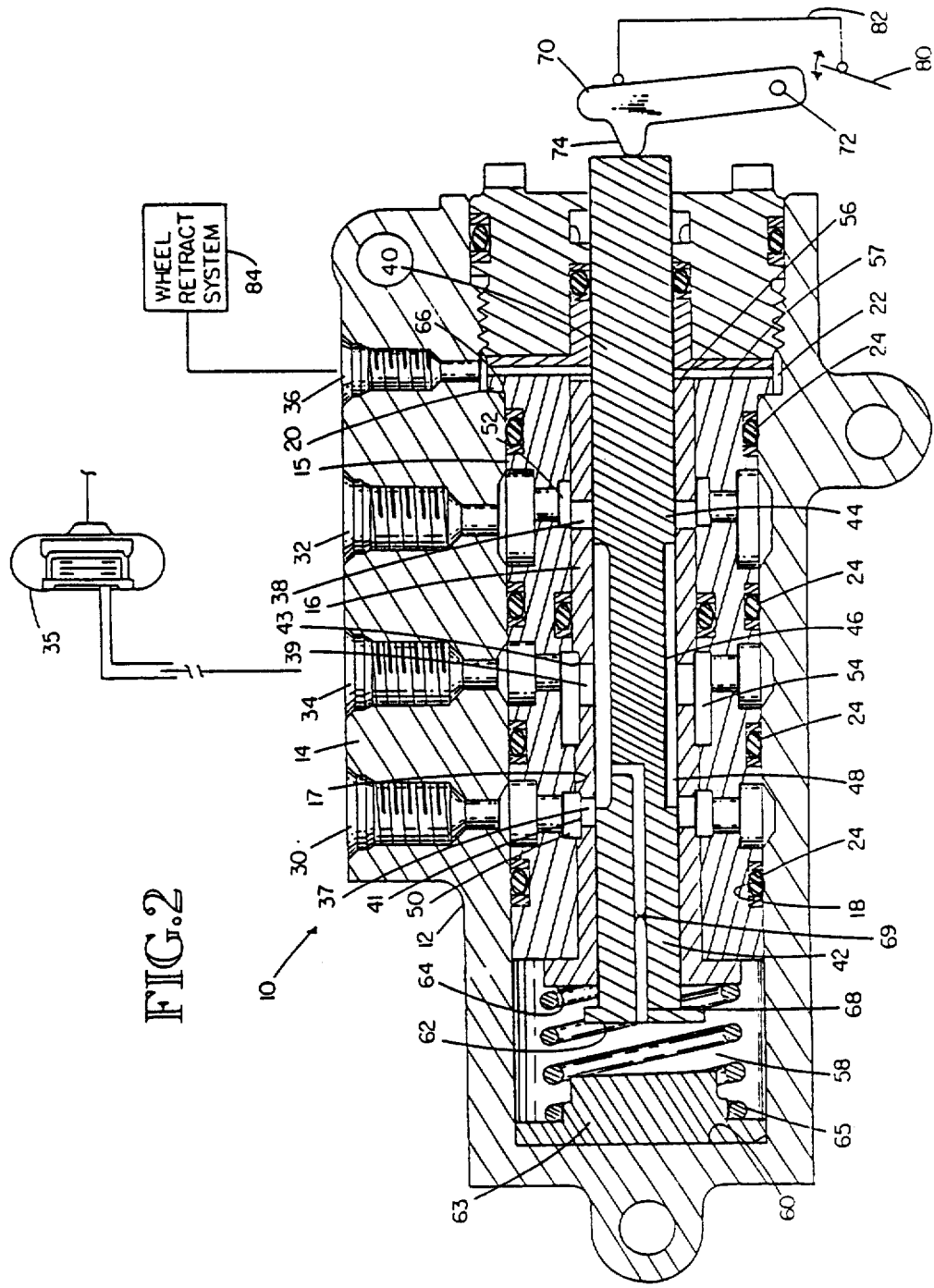

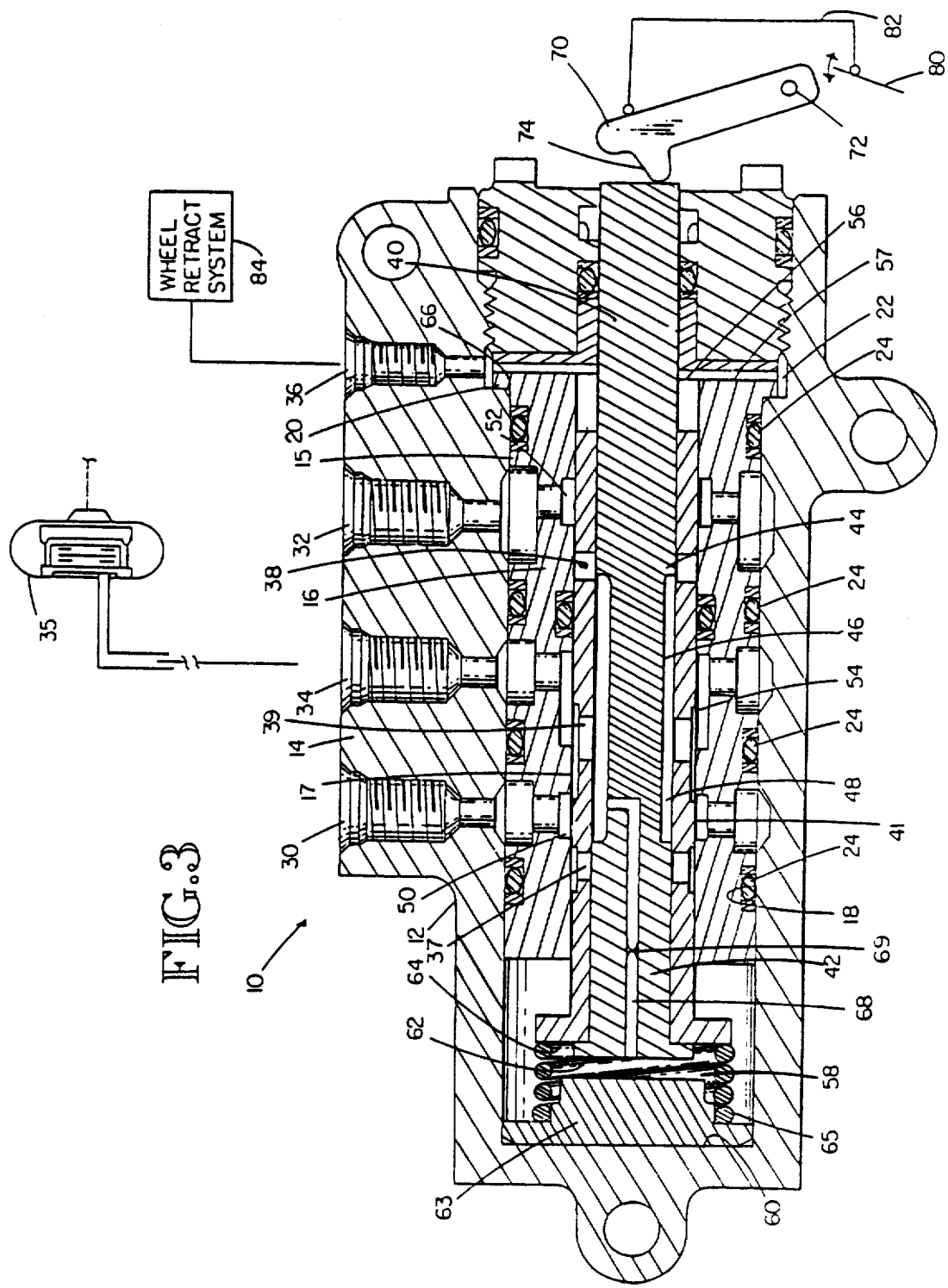

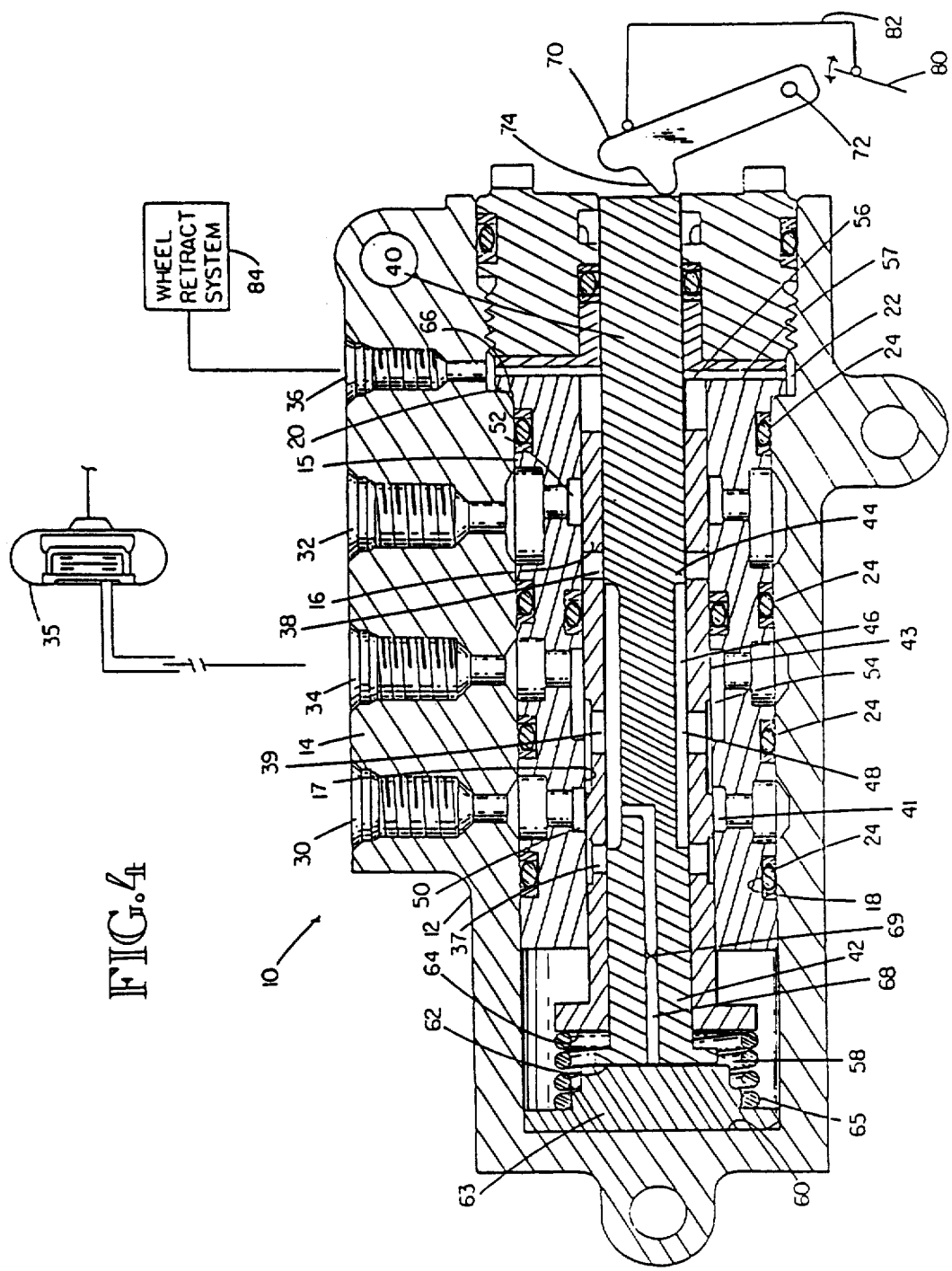

ANTIJAM BRAKE-METERING VALVE AND METHOD FOR ITS USE

DESCRIPTION

1. Technical Field

The present invention relates to the control of aircraft wheel brakes through brake-metering valves having port control members which meter fluid flow between a fluid supply and a hydraulic brake circuit. More specifically, it relates to a valve which simultaneously provides braking capability and feedback to the pilot in case a sliding sleeve within the brake-metering valve becomes jammed against the port control member and a method for using the valve to provide a ground check of whether the sliding sleeve is jammed against the outer sleeve.

2. Background Art

At present, many aircraft use a port control member to permit a pilot to control their wheel brakes. The port control member moves within a housing of the valve in response to the pilot's movement of a brake pedal and meters flow from a hydraulic fluid supply to a brake line in an amount proportional to the pilot's displacement of the brake pedal. The port control member also has an off position in which it blocks a pressure port from the fluid supply and connects the brake line to a return pressure port.

The valve is constructed to define a command pressure chamber which is connected to a despin port. The port control member is constructed to present a pressure surface portion to the command pressure chamber. The command pressure chamber, in turn, produces a force acting on the port control member, urging it towards a brake-applying position when the command pressure chamber is pressurized. Fluid pressure applied to the despin port and communicated to the command pressure chamber actuates the port control member to apply the brakes and stop the aircraft's wheels from spinning after takeoff. The despin port can be connected to a portion of the wheel retract system so that when pressure is delivered to the wheel retract system for retracting the wheels, some of this pressure will be introduced into the despin port. The pressure applied to the despin port accordingly causes the valve to apply the brakes, thereby stopping the wheels from spinning.

The command pressure chamber includes a surrounding annular chamber. The port control member has an annular chamber which surrounds the port control member. The port control member can have a first diameter at the end of the command pressure chamber closest to the closed end of the valve housing and a smaller second diameter at the end of the command pressure chamber closest to an open end of the valve housing. This provides an area differential on the port control member which is exposed to the command pressure chamber. The difference in area is a pressure surface portion which produces the force urging the port control member toward a brake-applying position when pressure is within the command pressure chamber. After the brakes have been applied, stopping the spin of the wheels, the feedback of the brake pressure to the feedback chamber functions to move the brakes to an off position.

In the current sliding sleeve valve design, it is possible for the sleeve to become jammed against the port control member without any forewarning to the pilot. In this case, the pilot cannot apply the brakes unless he can clear the jam. Although it is sometimes possible for the pilot to clear the jam by exerting sufficient force on the brake pedal, this is only marginally acceptable. The reason is that it is sometimes not possible for the pilot to exert sufficient force to clear the jam. A single jammed valve would prevent application of both the main and any alternative brake systems, leaving one side of the aircraft with no brakes.

There are no known previous attempts to overcome this failure mode on brake-metering valves. While dual-sleeve valve designs have been used in flight control actuators to allow operation after a jammed slide, these designs have a drawback in that a jam can exist between either the slide and inner sleeve or between the inner and outer sleeves without the pilot's knowledge. Continued use of such a partially failed valve could lead to total failure with no warning. In addition, such designs do not make it possible to verify if the inner sleeve is in good working condition without disassembly of the valve.

DISCLOSURE OF THE INVENTION

It is an object of the present invention to provide a slider-sleeve aircraft brake-metering valve which will provide an indication to the pilot in the event that the slider and sleeve become jammed.

It is another object of the present invention to provide a slider-sleeve aircraft brake-metering valve which will provide a feedback force to assure the pilot of its proper operation.

It is a further object of the present invention to provide an on-ground method for checking whether the aircraft brake-metering valve is jammed.

According to one aspect, the invention is a brake-metering valve for use in an aircraft to control fluid pressure and flow from a pressurized fluid supply to a wheel brake on a retractable landing gear. The valve comprises a housing, a slider, and an elongated port control member. The housing is connected to the fluid supply and the wheel brake. The slider is slidably received within the housing, and includes sets of transverse fluid communication ports formed in the slider. The elongated port control member is slidably received within the slider. It includes an external annular chamber which permits fluid communication between the sets of transverse ports in the slider when the slider and the port control member are suitably aligned. It further includes a feedback passageway between the external annular chamber and an interior end of the port control member.

The slider and the interior end of the elongated port control member form a feedback chamber within the housing, whereby a feedback force is generated on the port control member. The feedback force is increased if the slider should jam against the elongated port control member.

BRIEF DESCRIPTIONS OF THE DRAWINGS

FIG. 1 is a schematic view of a preferred embodiment of the present invention, showing the metering and despin valve of the present invention in an off position.

FIG. 2 is a schematic view of the preferred embodiment of the present invention, showing an unjammed metering and despin valve of the present invention in an on position.

FIG. 3 is a schematic view of the preferred embodiment of the present invention, showing the metering and despin valve of the present invention in an on position, the valve being in a first jammed condition.

FIG. 4 is a schematic view of the preferred embodiment of the present invention, showing the metering and despin valve of the present invention in an on position, the valve being in a second jammed condition.

DETAILED DESCRIPTION OF THE PREFERRED EMBODIMENT

Referring to FIG. 1, a preferred embodiment of the present invention includes a combined metering and despin valve 10. Valve 10 includes a housing 12, having an outer part 14, a sleeve 15, and an inner slider 16. The outer part 14 includes an axial chamber 18 which is shaped to receive the sleeve 15. Sleeve 15 includes a head portion 20 at its outer end which fits into a well 22 provided at the open end of the outer part 14. In known fashion, a plurality of seals 24 surround sleeve 15 and seal between sleeve 15 and the well 22 of the outer part 14. Inner slider 16 slides within the inner surface 17 of the sleeve 15, with a radial tolerance on the order of 0.0005 inch.

The outer part 14 also includes a pressure port 30, a return port 32, and a brake port 34. The brake port 34 is connected to the braking system on one or more wheels 35. The outer part 14 further includes a despin port 36. The outer portions of these ports 30, 32, 34, 36 are adapted to receive connector fittings at the ends of conduits for a hydraulic fluid.

The slider 16 includes a central axial passageway in which a port control member 40 is received. Slider 16 normally retains a fixed position with respect to the sleeve 15, but will move with the port control member 40 if they become jammed together. Slider 16 includes three circumferential series of axial ports 37, 38, and 39. Annular grooves 41 and 43 are resepectively formed outwardly adjacent axial ports 37 and 39. Port control member 40 comprises a pair of axially spaced apart lands 42, 44 of the same diameter, interconnected by a reduced diameter portion 46. The reduced diameter portion defines an annular gallery 48 between the two lands 42, 44. Normally gallery 48 causes ports 39 to communicate with port 38.

Annular chambers 50, 52, 54, and 56 are formed in the inner surface 17 of the sleeve 15. The axial extent of annular groove 43 is greater than the axial separation between annular chambers 50 and 54. The inner ends of pressure ports 30, 32, and 34 are respectively connected to annular chambers 50, 52, and 54 through axial ports 37, 38, and 39. The command pressure chamber 56 surrounds an inner end portion of the port control member 40. The inner end of despin port 36 communicates with the chamber 56 via passage 57, which serves as a command pressure chamber for actuating the slider 16 responsive to fluid pressure applied to the despin port 36. The pressure from the despin port 36 acts upon the transverse area of slider 16 which is adjacent the passage 57. The port control member 40 is forced against the slider 16 by the pressure in a feedback chamber 58.

The feedback chamber 58 is formed between an end wall 60 of housing part 14 and the inboard end 62 of port control member 40. The end portion 62 of port control member 40 includes a flange which is in contact with end 64 of slider 16 when the port control member 40 is fully extended. A spring guide and stop 63 is held in place against the end wall 60. The spring guide and stop 63 limits the travel of the port control member 40. A spring 65, extending between the spring guide and stop 63 and the end 64 and within the feedback chamber 58, produces a force to cause the slider 16 to return to a rest position in which the end portion 64 is forced against the end of sleeve 15.

In the event of a jam between the port control member 40 and the slider 16, the slider 16 will move to the left, allowing fluid communication between the pressure port 30 and the brake port 34 when the annular groove 43 simultaneously extends between ports 50 and 54. During normal and jammed operation, metered brake pressure is ported to the gallery region 48 from the pressure port 30, either through the annular groove 41 and the series of ports 37 in the slider 16 or through the annular groove 43 and the series of ports 39 in the slider 16. This metered brake pressure is, in turn, communicated to the left end of the port control member 40 through a feedback passageway 68 formed in the port control member 40 from a location in the reduced diameter portion 46 to the end portion 62. Feedback passageway 68 allows fluid communication between the feedback chamber 58 and the gallery region 48. Accordingly, the feedback chamber 58 communicates a feedback force to the pilot through linkages described below. In a jammed condition, however, the feedback force developed for a given brake pressure will be increased since the pressure contained within the feedback chamber 58 is working against both the inboard end 62 of the port control member 40 and the end wall 64 of the slider 16. This will indicate to the pilot that the slide is jammed and that it requires service.

The valve 10 is assembled by inserting the port control member 40 into the left end of slider 16. The resulting assembly of port control member 40 and slider 16 is then inserted into the left end of sleeve 15. In the final stage of assembly, the combination of port control member 40, sleeve 16, and slider 15 is inserted into the right end of housing 12 until the heads portion 20 contacts the shoulder 66.

Passageway 68 can include a damping orifice 69, having a small opening (such as 10 mils in diameter) for the purpose of damping any oscillations in the fluid pressure between the feedback chamber 58 and the annular gallery 48.

By way of illustrative example, the mechanical system for actuating the port control member 40 may comprise a crank arm 70 mounted for rotation about an axis 72. Arm 70 includes a pusher 74 positioned to make contact with the outer end of port control member 40.

FIG. 1 shows the system in a brake-off position. Land 42 blocks pressure port 30. Brake port 34 is communicated with return port 32 via gallery 48 and chambers 52, 54. The chamber 56, which may be termed a command pressure chamber, is closed inwardly by the land 44. The despin port 36 is connected to return pressure.

FIG. 2 is a schematic view of the preferred embodiment of the present invention, showing an unjammed metering and despin valve of the present invention in an on position. When the pilot steps on a brake pedal 80 to activate the brakes, a system of cable and linkages 82 causes the arm 70 to swing toward port control member 40. As the arm 70 moves, the pusher 74 displaces port control member 40 inwardly. Land 44 is then moved into a position in which it closes return port 32 and allows gallery 48 to be moved into communication with pressure port 30. Pressure port 30 is progressively uncovered so that flow and pressure are metered from the supply pressure to the brake lines via port 30, chamber 50, ports 37, gallery 48, ports 39, chamber 54, and port 34 in proportion to displacement of port control member 40.

FIG. 3 is a schematic view of the preferred embodiment of the present invention, showing the metering and despin valve of the present invention in an on position. The valve is in a first jammed condition, with the port control member 40 being jammed in an unextended position with respect to the slider 16. When the pilot steps on the brake pedal 80 to activate the brakes, the system of cable and linkages 82 causes the arm 70 to swing toward port control member 40. As the arm moves, the pusher 74 displaces port control member 40 inwardly. A portion of the chamber 54 is then axially extended into a shape in which it allows fluid communication between pressure port 30 and brake port 34 through chamber 50.

FIG. 4 is a schematic view of the preferred embodiment of the present invention, showing the metering and despin valve of the present invention in an on position, but with the valve in a second jammed condition. In this case, the port control member 40 is jammed in a partially extended position with respect to the slider 16. As in FIG. 3, when the pilot steps on the brake pedal 80 to activate the brakes, the system of cable and linkages 82 causes the arm 70 to swing toward port control member 40. This causes the pusher 74 to displace port control member 40 inwardly until a portion of the chamber 54 is axially extended into a shape in which it allows fluid communication between pressure port 30 and brake port 34 through chamber 50.

In accordance with the present invention, when it is desired to despin the aircraft wheels, the despin port 36 is connected to a supply pressure. This pressure moves the slider 16 inwardly to apply the brakes in order to stop the wheels from spinning. When despin pressure is removed, feedback pressure in chamber 58 and spring 65 return the slider 16 and port control member 40 to an off position.

The despin brake control is applied automatically in response to a command signal from the wheel retract cylinders. This is simply done by porting some of the pressure that is delivered to the retract cylinder to the despin port 36. Following retraction, the despin port 36 is connected to return pressure. This feature of the inventive valve permits an on-ground functional test of whether the slider 16 is jammed to the sleeve 15, since if the slider 16 were jammed, the despin function would not operate. On the ground, the test can be performed by applying fluid pressure to the despin port 36 through a conventional hydraulic fluid fitting (not shown) and visually observing whether the brakes in the wheel 35 are actuated. If they are actuated, the slider 16 cannot be jammed. Under current designs, this verification is not possible without complete disassembly of the valve 10.

The valving details can be accomplished in a number of ways and the specifics of these details are not a part of this invention. Therefore, the wheel retract system 84 is merely shown in block diagram form. The important aspect is that such system includes means for connecting supply pressure to despin port 36 at the start of the wheel retract operation, followed by a connection of the despin port 36 to return pressure.

This invention provides enunciation of a failure before total loss of brake-metering. This overcomes a design deficiency that can occur in current aircraft brake systems and is achieved with only a small increase in hardware. It should be understood that the invention may be implemented without the despin function. In this case, the valve would not include a despin port 36 and command pressure chamber 56.

It is to be understood that the system that has been illustrated and described is merely one embodiment of the invention. One skilled in the art will appreciate that modifications of the antijam brake-metering valve described above can be made without departing from the spirit and scope of the invention, which is to be limited only by the following claims.

I claim:

1. A brake-metering valve for use in an aircraft to control fluid pressure and flow from a pressurized fluid supply to a wheel brake on a retractable landing gear, said valve comprising:
   a housing connected to the fluid supply and the wheel brake;
   a slider slidably received within the housing, the slider including a plurality of sets of transverse fluid communication ports therethrough; and
   an elongated port control member slidably received within the slider, the port control member including an external annular chamber which permits fluid communication between the sets of transverse ports in the slider when the slider and the port control member are suitably aligned and further including a feedback passageway between the external annular chamber and an interior end of the port control member,
   the slider and the interior end of the elongated port control member forming a feedback chamber within the housing, whereby a feedback force is generated on the port control member, the feedback force being increased if the slider should jam against the elongated port control member.

2. The brake-metering valve of claim 1, further comprising damping orifice means within said feedback passageway.

3. The brake-metering valve of claim 1 wherein the housing further comprises a sleeve and the slider further includes a plurality of external annular grooves, the sleeve including a plurality of chambers associated with the fluid supply and the wheel brake, and being alignable with the external annular grooves for communication of the fluid pressure between the fluid supply and the wheel brake.

4. An aircraft, comprising:
   a fuselage;
   retractable landing gear for supporting the fuselage above the ground when the aircraft is landed;
   a braking system attached to the landing gear for causing braking actions to be imparted to the landing gear upon the application of hydraulic pressure and flow to the landing gear; and
   a brake-metering valve connected to the braking system, the valve comprising:
     a housing connected to the fluid supply and the wheel brake;
     a slider slidably received within the housing, the slider including a plurality of sets of transverse fluid communication ports therethrough; and
     an elongated port control member slidably received within the slider, the port control member including an external annular chamber which permits fluid communication between the sets of transverse ports in the slider when the slider and the port control member are suitably aligned and further including a feedback passageway between the external annular chamber and an interior end of the port control member, the slider and the interior end of the elongated port control member forming a feedback chamber within the housing, whereby a feedback force is generated on the port control member, the feedback force being increased if the slider should jam against the elongated port control member.

5. A brake-metering valve for use in an aircraft to control fluid pressure and flow from a pressurized fluid supply to a wheel brake through a retraction system on a retractable landing gear, said valve comprising:

a housing connected to the fluid supply and the wheel brake;

a slider slidably received within the housing, the slider including a plurality of sets of transverse fluid communication ports therethrough, said slider being caused to move by pressure from the retraction system and permitting fluid communication between the fluid supply and the wheel brake; and an elongated port control member slidably received within the slider, the port control member including an external annular chamber which permits fluid communication between the sets of transverse ports in the slider when the slider and the port control member are suitably aligned and further including a feedback passageway between the external annular chamber and an interior end of the port control member, the slider and the interior end of the elongated port control member forming a feedback chamber within the housing, whereby a feedback force is generated on the port control member, the feedback force being increased if the slider should jam against the elongated port control member, and the elongated port control member being aligned with the slider to transmit fluid communication through the slider to the wheel brake system if the slider should jam against the elongated port control member.

6. The brake-metering valve of claim 5, further comprising damping orifice means within said feedback passageway.

7. The brake-metering valve of claim 5 wherein the housing further comprises a sleeve and the slider further includes a plurality of external annular grooves, the sleeve including a plurality of chambers associated with the fluid supply, and the wheel brake, and being alignable with the external annular grooves for communication of the fluid pressure from the fluid supply to the wheel brake and the despin system.

8. A brake-metering valve for use in an aircraft to control fluid pressure and flow from a pressurized fluid supply to a wheel brake through a retraction system on a retractable landing gear, said valve comprising:

a housing connected to the fluid supply and the wheel brake, said housing comprising a sleeve;

a slider slidably received within the housing, the slider including a plurality of sets of transverse fluid communication ports therethrough, said slider being caused to move by pressure from the retraction system and permitting fluid communication between the fluid supply and the wheel brake; and an elongated port control member slidably received within the slider, the port control member including an external annular chamber which permits fluid communication between the sets of transverse ports in the slider when the slider and the port control member are suitably aligned and further including a feedback passageway between the external annular chamber and an interior end of the port control member, the pressure from the retraction system being incapable of actuating the wheel brake if the slider should jam against the sleeve, thereby providing a ground check of the valve.

9. A method for checking the functioning of a brake-metering valve for use in an aircraft, the valve being intended to control fluid pressure and flow from a pressurized fluid supply to a wheel brake through a retraction system on a retractable landing gear, the method comprising the steps of:

connecting a brake-metering valve housing to the fluid supply and the wheel brake;

placing an elongated sleeve inside the brake-metering valve housing;

slidably introducing a slider within the elongated sleeve, the slider being provided with a plurality of sets of transverse fluid communication ports therethrough, said slider being caused to move by pressure from the retraction system and permitting fluid communication between the fluid supply and the wheel brake; and slidably introducing an elongated port control member within the slider, the port control member including an external annular chamber which permits fluid communication between the sets of transverse ports in the slider when the slider and the port control member are suitably aligned and further including a feedback passageway between the external annular chamber and an interior end of the port control member, pressurizing the retraction system, and visually checking the wheel brake to see if it is actuated, thereby indicating whether the slider is jammed against the elongated sleeve.

* * * * *

UNITED STATES PATENT AND TRADEMARK OFFICE
CERTIFICATE OF CORRECTION

PATENT NO. : 4,993,781
DATED : February 19, 1991
INVENTOR(S) : Gary M. Lindahl

It is certified that error appears in the above-identified patent and that said Letters Patent is hereby corrected as shown below:

In column 1, between lines 5 and 6, please insert:

--Government Rights

The Government has certain rights in this invention.--

Signed and Sealed this

Eighteenth Day of August, 1992

Attest:

DOUGLAS B. COMER

Attesting Officer

Acting Commissioner of Patents and Trademarks